United States Patent
Taniguchi et al.

(10) Patent No.: US 6,750,634 B2
(45) Date of Patent: Jun. 15, 2004

(54) VEHICULAR POWER GENERATION CONTROL DEVICE AND METHOD

(75) Inventors: Makoto Taniguchi, Kariya (JP); Koji Tanaka, Anjo (JP)

(73) Assignee: Denso Corporation, Kairya (JP)

(*) Notice: Subject to any disclaimer, the term of this patent is extended or adjusted under 35 U.S.C. 154(b) by 194 days.

(21) Appl. No.: 10/122,379

(22) Filed: Apr. 16, 2002

(65) Prior Publication Data

US 2002/0158610 A1 Oct. 31, 2002

(30) Foreign Application Priority Data

Apr. 25, 2001 (JP) ........................... 2001-127182
Nov. 12, 2001 (JP) ........................... 2001-345743

(51) Int. Cl.⁷ .................... H02H 7/06; H02P 11/00; H02P 9/00
(52) U.S. Cl. ............... 322/28; 322/17; 322/22; 322/23; 322/24; 322/25
(58) Field of Search .................. 322/17, 22–25, 322/28

(56) References Cited

U.S. PATENT DOCUMENTS

| | | | |
|---|---|---|---|
| 5,493,202 A | 2/1996 | Iwatani et al. | 322/28 |
| 5,512,812 A * | 4/1996 | Ono | 322/28 |
| 5,656,922 A * | 8/1997 | LaVelle et al. | 322/46 |
| 5,929,613 A * | 7/1999 | Tsuchiya et al. | 322/58 |
| 5,936,314 A * | 8/1999 | Suganuma et al. | 307/10.1 |
| 5,994,787 A * | 11/1999 | Hibino | 307/10.1 |
| 6,281,664 B1 * | 8/2001 | Nakamura et al. | 322/22 |
| 6,313,613 B1 * | 11/2001 | Iwatani et al. | 322/12 |
| 6,377,031 B1 * | 4/2002 | Karuppana et al. | 323/220 |
| 6,429,539 B1 * | 8/2002 | Suzuki et al. | 290/40 A |
| 6,437,957 B1 * | 8/2002 | Karuppana et al. | 361/78 |
| 6,486,640 B2 * | 11/2002 | Adams | 322/59 |
| 6,534,959 B1 * | 3/2003 | Anderson et al. | 322/28 |
| 6,555,993 B2 * | 4/2003 | Taniguchi et al. | 322/28 |
| 6,556,457 B1 * | 4/2003 | Shimazaki et al. | 363/34 |
| 6,573,689 B1 * | 6/2003 | Renehan | 322/24 |
| 6,600,979 B1 * | 7/2003 | Kumar et al. | 701/20 |
| 6,614,207 B2 * | 9/2003 | Maehara et al. | 322/28 |
| 6,617,820 B2 * | 9/2003 | Carlson et al. | 318/727 |

FOREIGN PATENT DOCUMENTS

| JP | 58095959 A | * | 6/1983 | .......... H02K/11/00 |
|---|---|---|---|---|
| JP | U 62-44698 | | 3/1987 | |

OTHER PUBLICATIONS

U.S. patent application Ser. No. 09/891,222, Takahashi et al., filed Jun. 26, 2001.
U.S. patent application Ser. No. 09/978,537, Taniguchi et al., filed Oct. 18, 2001.
U.S. patent application Ser. No. 10/004,820, Taniguchi et al., filed Dec. 7, 2001.

* cited by examiner

*Primary Examiner*—Karl Tamai
*Assistant Examiner*—Pedro J. Cuevas
(74) *Attorney, Agent, or Firm*—Oliff & Berridge, PLC

(57) ABSTRACT

A vehicular power generation control device has a voltage control circuit, a power supply circuit and a power control circuit. The voltage control circuit controls the field current of a power generator by turning on and off a transistor. The power control circuit has an ignition switch closure detection circuit and an engine rotation detection circuit. When a closure of the ignition switch is detected by the ignition switch closure detection circuit, an operation of the rotation detection circuit is stopped. When the closure is not detected, the operation of the rotation detection circuit is started.

10 Claims, 3 Drawing Sheets

VEHICULAR POWER GENERATION CONTROL DEVICE AND METHOD

CROSS REFERENCE TO RELATED APPLICATION

This application is based on and incorporates herein by reference Japanese Patent Applications No. 2001-127182 filed on Apr. 25, 2001 and No. 2001-345743 filed on Nov. 12, 2001.

FIELD OF THE INVENTION

The present invention is related to vehicular power generation control device and method for controlling power generating conditions of a vehicular power generator installed in passenger vehicles and trucks.

BACKGROUND OF THE INVENTION

A vehicular power generation control device for controlling power generating conditions of a power generator generally has a function for detecting a power generation start by an ignition switch closure. This type of power generation control device performs a control operation so that the power generator starts generating power when the ignition switch closure is detected.

A power generation start detection circuit without the ignition switch closure detection function is disclosed in JP-U-62-44698. This start detection circuit determines whether or not a rotor starts rotating, namely, an onboard engine is started. This determination is made by detecting a frequency of induced voltage in stator windings.

A voltage regulator having both a function for detecting an ignition switch closure and a function for detecting an engine start utilizing residual magnetism is disclosed in JP-A-6-284596. With this device, power generation control can be continued even when a line for detecting the ignition switch closure is broken.

However, the ignition switch closure detection function is one kind of engine start detection functions. Therefore, when using the ignition switch closure detection function with the engine start detection function utilizing residual magnetism, those functions conflict each other. This may cause extra power consumption and unwanted oscillation because the engine start detection function is activated even though the ignition switch closure is already detected.

SUMMARY OF THE INVENTION

The first objective of the present invention is to provide a vehicular power generation control device having an ignition switch closure detection function and an engine rotation detection function utilizing a residual flux, as well as reducing power consumption and noise generation.

The second objective is to provide a vehicular power generation control method utilizing ignition switch closure detection and engine rotation detection that are performed without redundancy in order to reduce unnecessary power consumption and noise generation. That is, when ignition switch closure is detected, the rotation detection will not be performed, and when the ignition switch closure is not detected, the rotation detection is performed.

The third objective is to reduce a malfunction of the vehicular power generation control device due to a leak current.

A vehicular power generation control device of the present invention controls output voltages of a vehicular power generator. The power generation control device has the first switching device, a voltage control device, an engine rotation detection device and an ignition switch closure detection device. The first switching device is connected in series with the field winding of the power generator. The voltage control device controls on/off conditions of the first switching device in order to control the output voltage. The rotation detection device detects the output voltage of the stator windings of the power generator to detect the start of engine and starts the operation of the voltage control device. The ignition switch closure detection device detects an ignition switch closure and starts the operation of the voltage control device.

When the ignition switch closure is detected by the ignition switch closure detection device, the device stops the operation of the rotation detection device. Performing the engine start detection by the rotation detection device although the ignition switch closure has been detected results in extra power consumption. An occurrence of unwanted oscillation caused by switching components in each part of the rotation detection device can be reduced. This reduces unwanted noise. Therefore, it is possible to provide a vehicular power generation control device having both ignition switch closure detection function and engine rotation detection function with low power consumption and low noise.

A frequency of phase voltage generated by the residual magnetism is proportional to the number of rotation of the rotor. Therefore, by measuring this frequency to detect the start of engine, a start detection function with high reliability at low cost can be provided in a small space.

When utilizing special-purpose sensors including a rotation sensor, special consideration for a structure is necessary to ensure the reliability. Vehicular power generators are generally used in high temperature and heavily vibrating conditions. Because the space for the power generators is limited, the one that can withstand such environments becomes high in cost and large in size. On the other hand, when detecting the frequency of the phase voltage generated by the residual magnetism, no additional sensor nor space for it is necessary. Moreover, only modification to a part of the circuit is required to implement the detection. As a result, high reliability can be provided at low cost.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings.

[First Embodiment]

Figure 1:
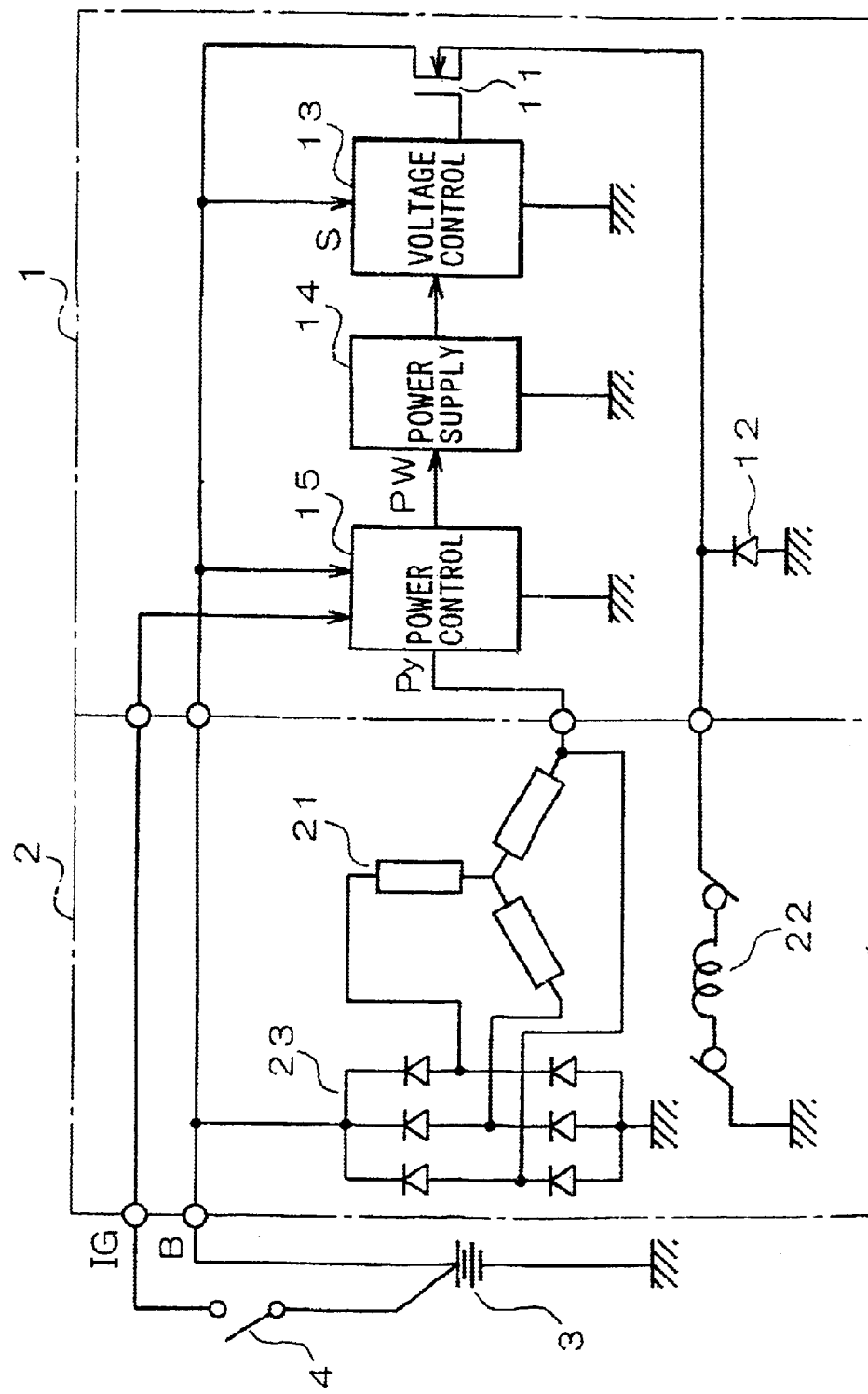
FIG. 1 is a block diagram showing a configuration of a vehicular power generation control device according to the first embodiment of the present invention.

Referring to FIG. 1, a vehicular power generation control device 1 controls an output of a vehicular power generator 2 to remain within a predetermined range. The power generator 2 has three-phase stator windings 21, a field winding 22 and a rectifier 23. The three-phase stator windings 21 and the field winding 22 are included in a stator and a rotor, respectively. The rectifier 23 performs full-wave rectification to three-phase outputs of the stator windings 21. The control to the output voltage of the power generator 2 is performed by adjusting a field current flowing to the field winding 22. An output terminal (B-terminal) of the power generator 2 is connected with a battery 3 or other electrical loads (not shown). The power generator 2 supplies currents to the battery 3 and other electrical loads.

The power generation control device 1 has a power transistor 11, a flywheel diode 12, a voltage control circuit 13, a power supply circuit 14 and a power control circuit 15. The power transistor 11 is connected in series with the field winding 22 and used as the first switching device for passing or cutting off the field current. The flywheel diode 12 is connected in parallel with the field winding 22. It is used for backflow of field current to the negative terminal of the battery 3 when the power transistor 11 is turned off.

The power control circuit 15 detects a start of rotation of the power generator 2 based on any one of the phase voltages of the stator windings 21 and drives the power supply circuit 14. The power supply circuit 14 supplies power necessary for maintaining an operating condition of the voltage control circuit 13. The voltage control circuit 13 monitors the output voltage of the power generator 2. This monitoring is to control on/off conditions of the power transistor 11 so that the output voltage remains within the predetermined range.

Figure 2:
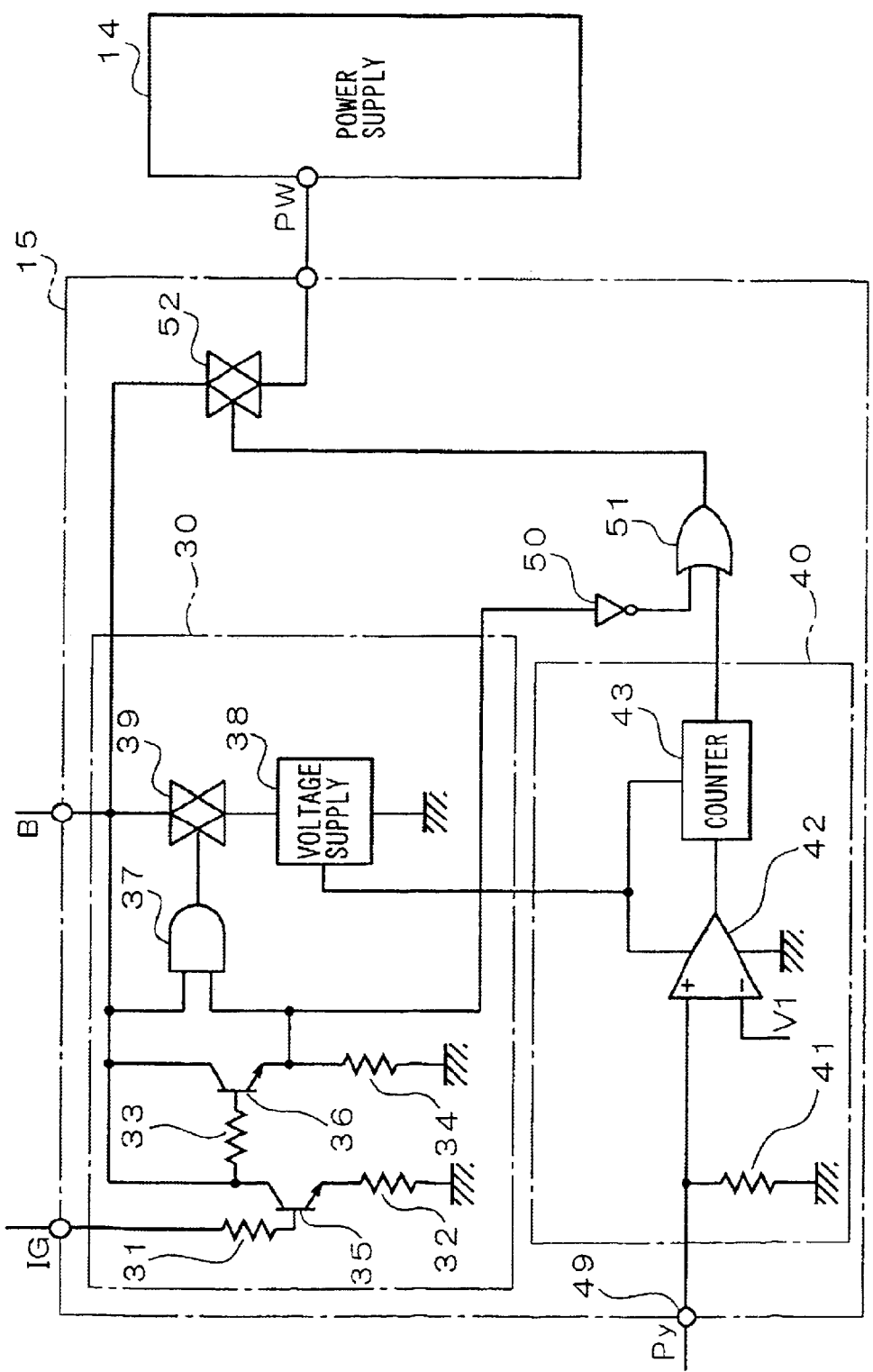
FIG. 2 is a circuit diagram showing a detailed configuration of a power control circuit used in the first embodiment.

Referring to FIG. 2, the power control circuit 15 has an ignition switch closure detection circuit 30, an engine rotation detection circuit 40, an inverter circuit 50, an OR circuit 51 and an analog switch 52.

The ignition switch closure detection circuit 30 is for detecting a closure of an ignition switch 4 to an accessory position. It performs the detection by monitoring voltages of IG line to which the ignition switch 4 is connected. The circuit 30 has resistors 31 to 34, transistors 35 and 36, an AND circuit 37, a voltage supply circuit 38 and an analog switch 39. The rotation detection circuit 40 is for detecting a start of an engine (not shown) based on the Y-phase voltage Py, which is applied to an input terminal 49 from the stator windings (Y-phase) 21. The circuit 40 has a resistor 41, a voltage comparator 41 and a counter circuit 43.

The inverter circuit 50 inverts logic of the output signals of the ignition switch closure detection circuit 30. The OR circuit 51 outputs logical OR of the output signals of the inverter circuit 51 and rotation detection circuit 40. The analog switch 52 is for switching connections between the battery 3 and power supply circuit 14. It is driven by the output signals of the OR circuit 51.

The voltage control circuit 13 and power supply circuit 14, the rotation detection circuit 40, and the ignition switch closure detection circuit 30 correspond to the voltage control device, rotation detection device, and ignition switch closure detection device, respectively.

(1) Operation of the Ignition Switch Closure Detection Circuit (1—1) When the Ignition Switch is Closed One end of the IG line is connected with the positive terminal of the battery 3 via the ignition switch 4, and the other end is connected with a base of the transistor 35 via the resistor 31. A battery voltage is applied to the IG line when the ignition switch 4 is closed, and the transistor 35 is turned on. This cuts off a base current of the transistor 36. Since the transistor 36 is turned off at that time, one of the inputs of the AND circuit 37 becomes low. As a result, the output of the AND circuit 37 becomes low. This turns off the analog switch 39 and the battery voltage is not applied to the voltage supply circuit 38. Therefore, the voltage supply circuit 38 is at a standstill.

The emitter of the transistor 36 is connected with a control terminal of the analog switch 52 via the inverter circuit 50 and OR circuit 51. When the potential of the emitter becomes low after the ignition switch 4 is closed, the outputs of the inverter circuit 50 and OR circuit 51 both become high. As a result, the analog switch 52 turns on to supply the battery voltage to the power supply circuit 14, and the power supply circuit 14 starts its power supply operation to the voltage control circuit 13. Then, the voltage control circuit 13 starts its field current control operation for the field winding 22 by controlling the power transistor 11 at the predetermined duty ratio.

The rotation detection circuit 40 starts its rotation detection operation only when an operating voltage produced by the voltage supply circuit 38 is applied. When the ignition switch 4 is closed and the voltage supply circuit 38 is at a standstill as described above, the rotation detection circuit 40 is at a standstill and does not operate.

(1–2) When the Ignition Switch is Not Closed

When the ignition switch is not closed, the transistor 35 turns off and the transistor 36 turns on. Therefore, the potential of the emitter of the transistor 36 applied to the AND circuit 37 becomes high. The battery voltage is inputted to the other terminal of the AND circuit 37. Therefore, the output of the AND circuit 37 becomes high when the potential of the emitter of the transistor 36 becomes high. In this condition, the analog switch 39 turns on. As a result, the voltage supply circuit 38 starts its voltage supply operation. Then, the predetermined operating voltage is applied to the rotation detection circuit 40.

(2) Operation of the Rotation Detection Circuit 40

The voltage comparator 42 and counter circuit 43 within the rotation detection circuit 40 are driven by the operating voltage applied by the voltage supply circuit 38.

The field poles included in the power generator 2 are commonly made of a soft magnetic material, such as a low carbon steel material. Once they are magnetized, an infinitesimal magnetic field is generated by residual magnetism even if the field current is not provided. When the field poles start being rotated by the engine, an infinitesimal alternating magnetic flux passes through the stator windings 21. Therefore, an infinitesimal Y-phase AC voltage Py appears at the input terminal 49 at the start of the engine. The frequency of the AC voltage is proportional to the number of rotation of the rotor and increases as the number of rotation becomes higher.

The voltage comparator 42 compares the Y-phase voltage Py with the predetermined reference voltage V1 to convert it into binary signals. Then, the voltage comparator 42 outputs pulse signals at a frequency proportional to the number of rotation of the power generator 2. The counter circuit 43 counts the number of pulse signals outputted from the voltage comparator 42. When the counted number exceeds the predetermined value (frequency) N, that is, when the engine rotation speed rises, the counter circuit 43 switches its output from low to high level. Therefore, the output of the OR circuit 51 becomes high, which turns on the analog switch 52. After the analog switch 52 is turned on, the battery voltage is applied to the power supply circuit 14 and the power supply circuit 14 starts its operation.

It is preferable that the predetermined value N is set smaller than the value twice the frequency corresponding to the number of rotation at which the power generator 2 starts generating power in a fully energized state. The number of rotation during the vehicle is at idle is normally equal to or higher than the value twice the number of rotation at which the generator starts generating power in a fully energized state. By setting the number of rotation as described above, the power generating condition of the power generator 2 can be maintained even when the engine runs at idle.

The rotation detection circuit 40 is at a standstill when the closure of the ignition switch 4 is detected. Therefore, unnecessary power consumption can be reduced resulting in a reduction of power consumption. When the engine runs at idle for a while after the ignition switch 4 is closed, the power generator 2 is at stand-by. In this case, the closure of the ignition switch 4 is detected by the ignition switch closure detection circuit 30. Therefore, the power generation control device 1 can start power generation control to the power generator 2 immediately after the engine is started without the rotation detection.

This reduces unwanted power consumption. Moreover, noise can be reduced since an occurrence of unwanted oscillation caused by switching components in each part of the rotation detection device can be reduced. Thus, it is possible to provide a power generation control device having both ignition switch closure detection function and engine start detection function with low power consumption and low noise.

[Second Embodiment]

Figure 3:
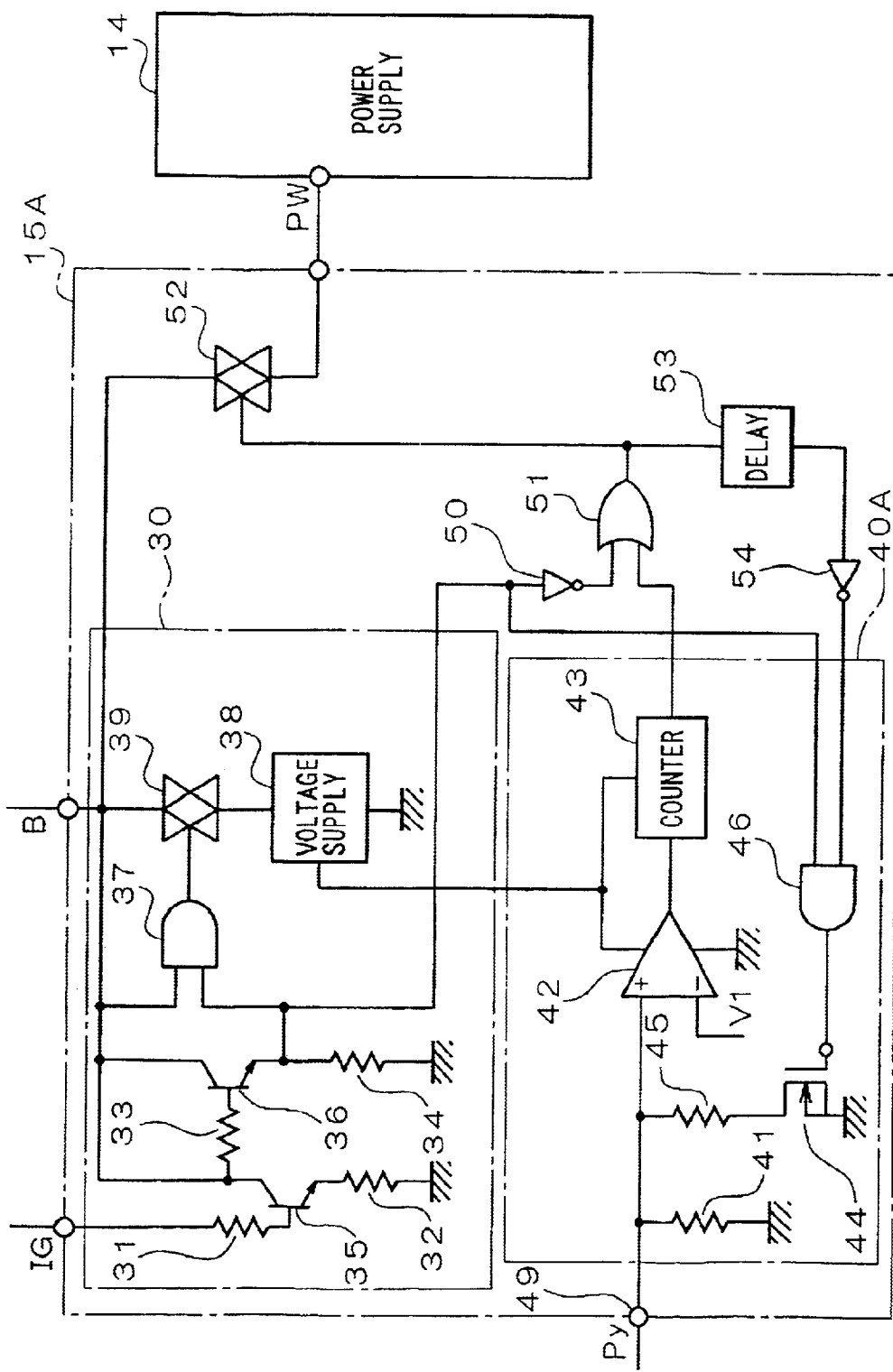
FIG. 3 is a circuit diagram showing a configuration of power control circuit included in the vehicular power generation control device according to the second embodiment of the present invention.

Referring to FIG. 3, the rotation detection circuit 40 is replaced with a rotation detection circuit 40A, and a delay circuit 53 and an inverter circuit 54 are added on the output side of the OR circuit 51. A transistor 44, a resistor 45 and an AND circuit 46 are added to the rotation detection circuit 40 and referred to as the rotation detection circuit 40A.

The transistor 44 is provided as the second switching device. It functions as a clamp switch for passing a leak current, appearing in the stator windings 21 or rectifier 23, to the ground. A MOS-type FET may be used for the transistor 44. The resistor 45 is connected between the input terminal 49 and the transistor 44. The resistance of the resistor 45 is set smaller than that of the resistor 41 connected between the internal terminal 49 and the ground.

The output signal of the ignition switch closure detection circuit 30 is inputted to one of the input terminals of the AND circuit 46. The output signal of the inverter circuit 54 is inputted to the other input terminal. The output signal of the OR circuit 51 is inputted to the delay circuit 53. The logic of the output signal of the delay circuit 53 is inverted by the inverter circuit 54 and inputted to the AND circuit 46. The delay circuit 53, inverter circuit 54 and AND circuit 46 correspond to the switching control device.

The transistor 44 passes a leak current, flowing from the battery 3 to the stator windings 21 or rectifier 23, back to the negative terminal of the battery 3 via the resistor 45. This reduces an increase in the phase-voltage Py.

However, when the transistor 44 remains turned on, the power generator 2 starts generating power and an induced voltage is produced in the Y-phase winding. When the phase-voltage Py is increased by the induced voltage, a generated power is passed back to the windings of other phases via the transistor 44 and negative-side rectifier components of the rectifier 23. As a result, the battery 3 cannot be charged causing unnecessary power consumption. To avoid this, the transistor 44 needs to be turned off immediately after the power generator 2 starts generating power.

On the other hand, the transistor 44 needs to be turned on when the ignition switch 44 is not closed and the frequency of the phase-voltage Py is lower than the predetermined value. The output of the ignition switch closure detection circuit 30 is inputted to one of the input terminals of the AND circuit 46. The output of the counter circuit 43 is inputted to the other input terminal via the delay circuit 53 and inverter circuit 54. As a result, the transistor 44 can be turned on in such timing.

In the power generation control device, the rotation detection circuit 40A is at a standstill when the closure of the ignition switch 4 is detected. Therefore, unnecessary power consumption can be prevented and power consumption can be reduced. Moreover, the leak current can be passed back to the negative terminal of the battery 3 via the resistor 45 in the case that the phase-voltage Py is increased by the leak current. This reduces an increase in the phase voltage Py. Therefore, malfunctions due to the leak current can be reduced.

The present invention should not be limited to the embodiment previously discussed and shown in the figures, but may be implemented in various ways without departing from the spirit of the invention.

There may be a case that the closure of the ignition switch 4 cannot be detected even though an infinite frequency of the phase voltage Py is detected after power generation is started. In such a case, the operation of the power supply circuit 14 may be stopped when the frequency becomes lower than the frequency M. The frequency M is lower than the predetermined value N used for rotation detection in the rotation detection circuit 40 or 40A.

To perform such control, the counter circuit 43 may be provided with hystereses. With the hystereses, the output varies from low to high when the counted value exceeds N during an increase in frequency. During a decrease in frequency, the output varies from high to low when the count value becomes lower than M. Or the operation of the power supply circuit 14 may be stopped when the frequency of the phase-voltage Py lower than the value M is detected after the power supply circuit 14 starts operating.

It is preferable that the value M is set equal to or less than the frequency (N/2) corresponding to the number of rotation at which the power generator starts generating power in a fully energized state. By doing so, the power generation is stopped when the number of rotation becomes considerably lower than the number of rotation in the idle condition. Therefore, the power generating condition can be maintained even when the number of rotation of the engine becomes low and the engine is put in an idle condition.

A warning lamp, which notifies a driver of abnormal condition of the power supplying system, may be connected to the IG line. This may cause malfunction of the ignition switch closure detection when the warning lamp becomes exhausted and electrically disconnected. However, power generation can be started by detecting the start of the engine utilizing the rotation detection function of the rotation detection circuit 40 or 40A. In this case, availability of start detection is sent to an external control device (e.g., ECU) and perform detection for abnormal condition in the power supplying system. This is because the warning lamp cannot be illuminated.

In the embodiments discussed above, the rotation detection is performed based on the phase-voltage Py in the condition that no field current is supplied to the field winding 22. However, the field current may be supplied to amplify the voltage as necessary so that binary pulse generating operation performed by the voltage comparator 42 becomes easier.

What is claimed is:

1. A vehicular power generation control device for controlling output voltages of a vehicular power generator having a rotor that has a plurality of field poles, a field winding that magnetizes the field poles, a stator that has stator windings in which an AC voltage is induced by a rotating magnetic field caused by the rotor, and a rectifier that converts an output of the stator windings from AC to DC, comprising:

a first switching means connected in series with the field winding;

a voltage control means for controlling the output voltage by controlling on/off conditions of the first switching means;

a start detection means detecting a start of an engine by detecting an output voltage waveform of the stator windings thereby to start operations of the voltage control means; and an ignition switch closure detection means for detecting an ignition switch closure thereby to start operations of the voltage control means, wherein the operations of the start detection means are stopped when the ignition switch closure is detected by the ignition switch closure detection means.

2. A vehicular power generation control device as in claim 1, wherein the start detection means measures a frequency of phase voltages that appear at an input terminal connected to any one of phases of the stator windings and starts the operation of the voltage control means when the frequency exceeds a predetermined value.

3. A vehicular power generation control device as in claim 1, further comprising:

a second switching means which connects and disconnects the input terminal to a negative terminal of an onboard battery; and a switching control means which turns on the second switching means prior to a start of the engine detected by the start detection means.

4. A vehicular power generation control device as in claim 1, wherein the voltage control means starts passing a field current to the field winding by turning on the first switching means at a predetermined duty ratio when the ignition switch closure is detected by the ignition switch closure detection means.

5. A vehicular power generation control device as in claim 2, wherein the operations of the voltage control means are stopped when the frequency of the phase voltage waveform becomes below a predetermined value, which is smaller than the predetermined value.

6. A vehicular power generation control device as in claim 2, wherein the predetermined value is set smaller than twice the frequency corresponding to a number of rotations at which the vehicular power generator starts generating power in a fully energized state.

7. A vehicular power generation control device as in claim 5, wherein the predetermined value is set smaller than the frequency corresponding to the number of rotations at which the vehicular power generator starts generating a power in a fully energized state.

8. A vehicular power generation control method comprising steps of:

detecting a start of operation of an engine from an ignition switch closure;

detecting the start of operation of the engine from a rotation of the engine; and starting a field current control for a power generator of the engine when the start of operation of the engine is detected from the ignition switch closure or the rotation of the engine, wherein the step of detecting the start of operation of the engine from the rotation of the engine is disabled when the start of operation of the engine is detected from the ignition switch closure.

9. A vehicular power generation control method as in claim 8, wherein:

the step of detecting the start of operation of the engine from the rotation measures a frequency of an output voltage of the power generator; and the step of starting the field current control starts controlling a field current when the frequency exceeds a predetermined value.

10. A vehicular power generation control method as in claim 9, wherein the output voltage of the power generator is detected from one of three-phase stator windings of the power generator.

* * * * *